(12) United States Patent
Su et al.

(10) Patent No.: US 8,864,431 B2
(45) Date of Patent: Oct. 21, 2014

(54) SCREW CAPABLE OF RAPIDLY DRILLING AND CUTTING

(75) Inventors: Kou-Tsair Su, Kaohsiung (TW);
Yu-Jung Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 282 days.

(21) Appl. No.: 13/419,650

(22) Filed: Mar. 14, 2012

(65) Prior Publication Data
US 2013/0243547 A1 Sep. 19, 2013

(51) Int. Cl.
*F16B 25/10* (2006.01)

(52) U.S. Cl.
USPC .................................... 411/387.1; 411/412

(58) Field of Classification Search
USPC .......... 411/387.1, 387.3, 387.5, 387.6, 387.7, 411/387.8, 412, 418
See application file for complete search history.

(56) References Cited

U.S. PATENT DOCUMENTS

| | | | | | |
|---|---|---|---|---|---|
| 438,754 | A | * | 10/1890 | Rogers | 411/387.1 |
| 3,478,639 | A | * | 11/1969 | Grunca | 411/387.1 |
| 3,738,218 | A | * | 6/1973 | Gutshall | 411/387.7 |
| 3,779,664 | A | * | 12/1973 | Caley et al. | 408/225 |
| 4,568,229 | A | * | 2/1986 | Hulsey | 411/387.8 |
| 4,655,661 | A | * | 4/1987 | Brandt | 411/387.1 |
| 4,900,208 | A | * | 2/1990 | Kaiser et al. | 411/387.1 |
| 5,074,729 | A | * | 12/1991 | Oba | 411/387.8 |
| 6,354,779 | B1 | * | 3/2002 | West et al. | 411/80.1 |
| 7,393,170 | B2 | * | 7/2008 | Chen | 411/387.1 |
| 2009/0142159 | A1 | * | 6/2009 | Wolpert et al. | 411/387.1 |

* cited by examiner

*Primary Examiner* — Gary Estremsky
(74) *Attorney, Agent, or Firm* — Muncy, Geissler, Olds & Lowe, P.C.

(57) ABSTRACT

A screw capable of drilling and cutting includes two inclined cutting planes with a cutting edge formed on a convergence of the cutting planes. A tapered positioning member extends from the convergence of the cutting planes, where the cutting edge is divided into dual sub cutting edges by means of the positioning member. Each sub cutting edge has an inclined angle. An included angle included by the sub cutting edges is smaller than 180 degrees. Threads spiral on a shank and extend to the sub cutting edges. Setting the positioning member against on an object permits a steady performance during the first stage of screwing. Subsequently, the sub cutting edges provides a scraping effect on the object during drilling. Torque is reduced and drilling speed is promoted.

18 Claims, 8 Drawing Sheets

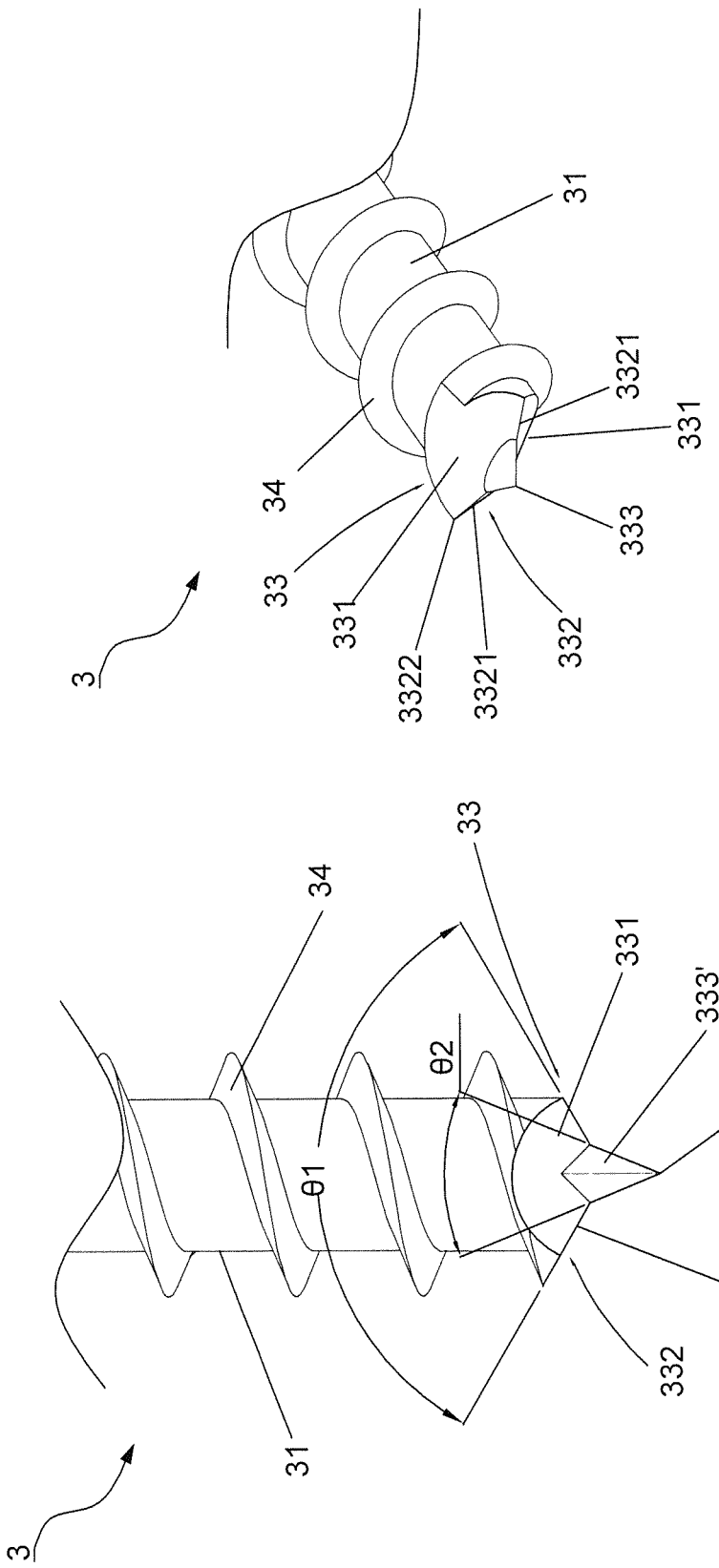

SCREW CAPABLE OF RAPIDLY DRILLING AND CUTTING

BACKGROUND OF THE INVENTION

1. Field of the Invention

The present invention relates to a fastener design, particularly to a screw capable of rapidly drilling and cutting.

2. Description of the Related Art

Referring to FIG. 1, a conventional screw 1 comprises a shank portion 11, a head portion 12 disposed at one end of the shank portion 11, a drilling portion 13 disposed at the other end of the shank portion 11, and a plurality of threaded units 14 spirally disposed around the shank portion 11. Wherein, the drilling portion 13 is formed into a tapered end. Thus, the screw 1 directly enters an object 2 via the tapered drilling portion 13, and the following threaded units 14 continue entering the object 2 so as to achieve a fastening effect.

Afore screw 1 might be smoothly fastened into the object 2 (such as plywood) by means of the drilling portion 13 piercing the object 2. However, in practice, the object 2 is forcedly pierced by the tapered drilling portion 13. Thus, it is difficult to completely sever fibers contained in the object 2. That is to say, the fibers are just simply pushed and thrust by the tapered drilling portion 13, so the screw 1 would be easily impeded by debris resulted from the object 2 in time of drilling. As a result, the debris can not be timely expelled, and the heaped debris incurs an increasing resistance on the screw 1. Thereby, the operation of fastening the screw 1 is influenced and the object 2 may be easily broken.

Referring to FIG. 2, the upright screw 1 in the object 2 might be subject to rustiness since water might pile on the head portion 12. Therefore, in the practical application, the screw 1 is disposed tilting in the object 2. Herein, if the cutting debris can not be timely expelled, the head portion 12 easily bulges out of the object 2 after screwing. Such abnormal operation is unbeneficial for further fastening. Therefore, the screw 1 needs improvements.

SUMMARY OF THE INVENTION

It is therefore the purpose of this invention to provide a screw that is capable of rapidly drilling and cutting so as to promote the screwing speed and the debris-guiding effect but decrease the screwing torque, thereby beneficial for succeeding operation.

The screw capable of rapidly drilling and cutting in accordance with the present invention comprises a shank, a head disposed at one end of the shank, a drilling portion disposed at the other end of the shank, and a plurality of threaded units spirally disposed around the shank. Two inclined cutting planes are formed on the drilling portion and the two inclined cutting planes are connected at a cutting edge. Wherein, a tapered positioning member extends outward from a convergence of the cutting planes for dividing the cutting edge into dual sub cutting edges. Each sub cutting edge is disposed by an inclined angle. A first included angle formed by the sub cutting edges is less than 180 degrees. The first included angle of the sub cutting edges is different from a second included angle of a taper of the tapered positioning member.

Preferably, a blank area defined on the shank divides the threaded units into a first section and a second section; a first diameter of the blank area is larger than a second diameter of the shank but smaller than a third diameter of the threaded units.

Preferably, the second included angle of a taper of the tapered positioning member is smaller than the first included angle of the sub cutting edges.

Preferably, the threaded units on the shank are spread to the sub cutting edges for connecting to one end of the sub cutting edges.

Preferably, a third section is defined on the shank and includes a plurality of auxiliary threaded units; the auxiliary threaded units are disposed between the threaded units; a fourth diameter of the auxiliary threaded units is smaller than a third diameter of the threaded units.

Preferably, a plurality of indented threads are formed on the auxiliary threaded units; a plurality of second guiding channels are partially defined on a part of the threaded units.

Preferably, the positioning member is formed by a plurality of inclined walls for structuring a pyramid.

Preferably, the positioning member is structured into a cone.

Accordingly, the positioning member helps the screw stably stand on a screwing object, which allows the sub cutting edges to provide a succeeding scraping effect in time of drilling. Further, the cutting planes guide cutting debris to smoothly enter the channels between the threaded units so as to rapidly expel the cutting debris therefrom. Thereby, the cutting debris does not pile into the vacancy of the threaded units, so that the screwing torque could be decreased but the screwing speed could be enhanced. Moreover, the screw is favorably embedded in a screwing object without any protrudent part. Therefore, such even screwing object is beneficial to be further fastened.

BRIEF DESCRIPTION OF THE DRAWINGS

FIG. 5 is a partial view of the first preferred embodiment of the present invention;

FIG. 6 is a schematic view showing the first preferred embodiment of the present invention in screwing;

DETAILED DESCRIPTION OF THE PREFERRED EMBODIMENTS

Figure 1:
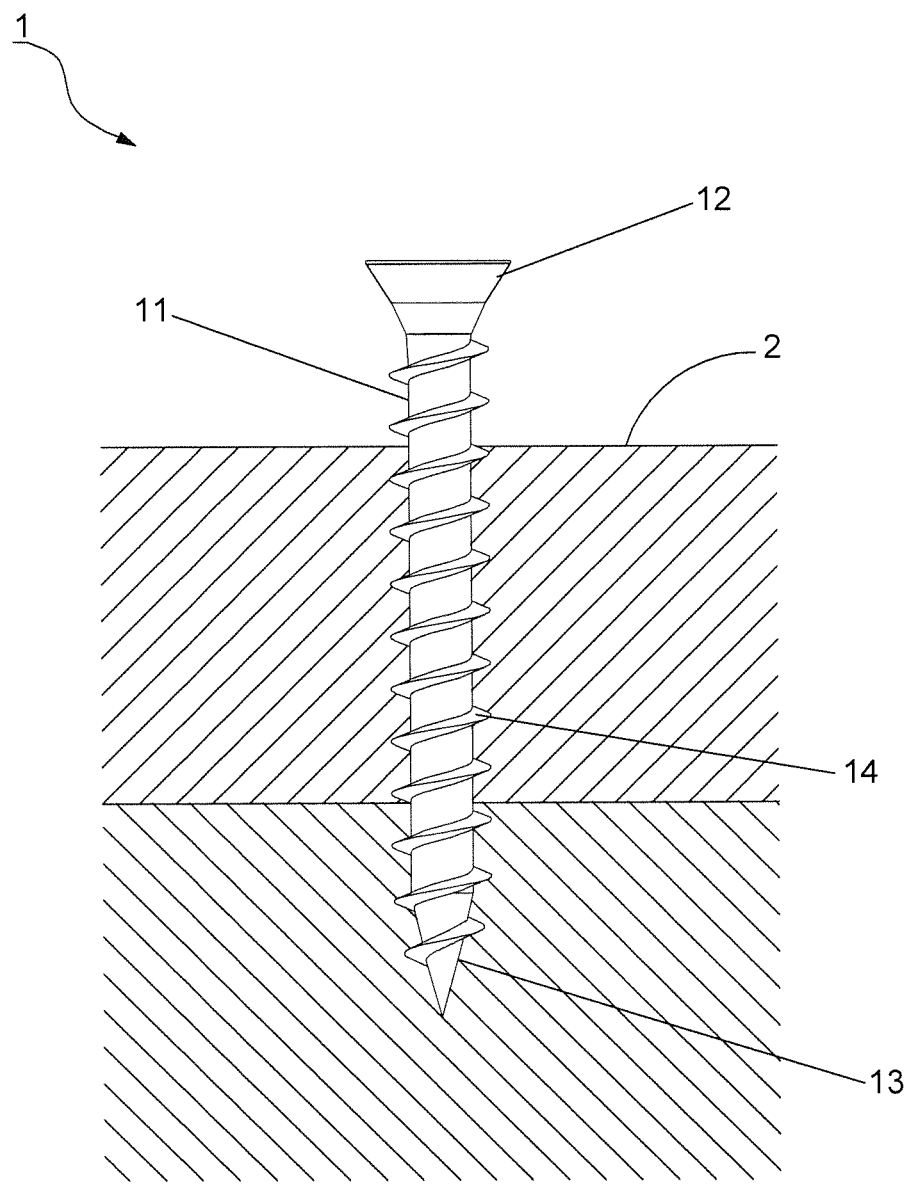
FIG. 1 is a schematic view showing a conventional screw.
Figure 2:
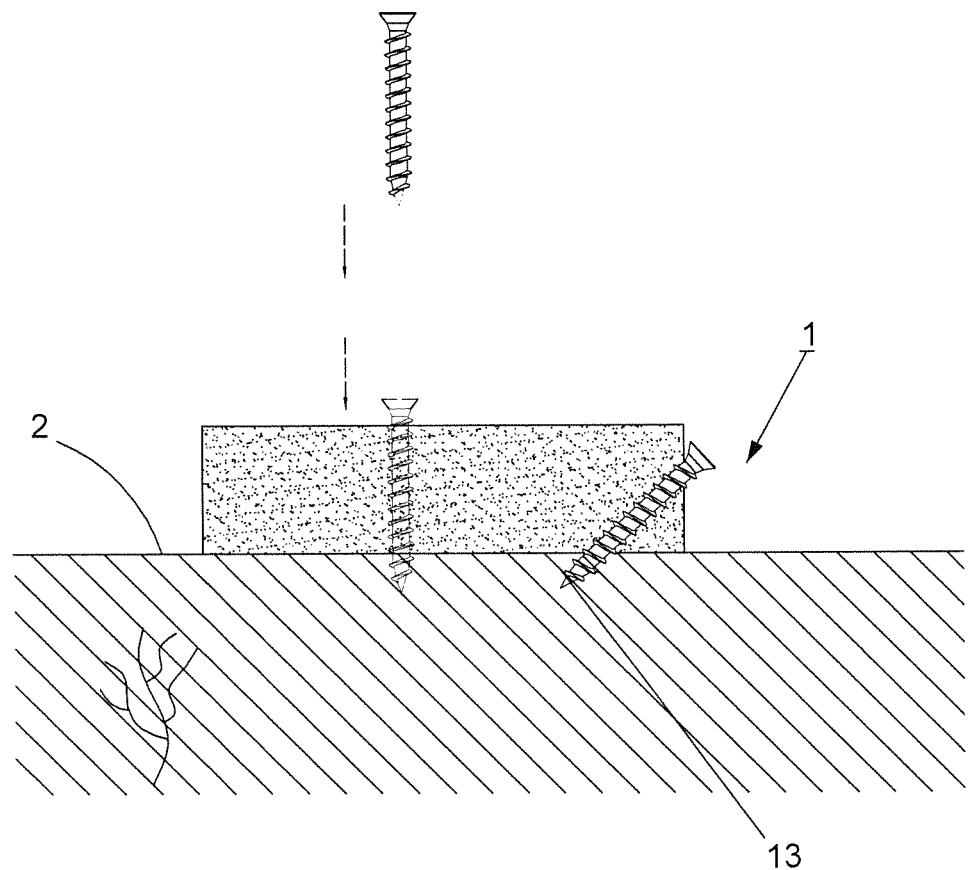
FIG. 2 is a schematic view showing the conventional screw in screwing.

Wherever possible, the same reference numbers are used in the drawings and the description to refer to the same or like parts.

Figure 4:
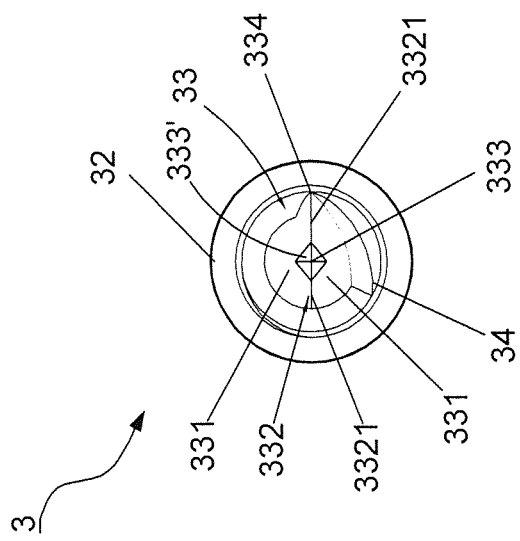
FIG. 4 is an end view of FIG. 3.
Figure 3:
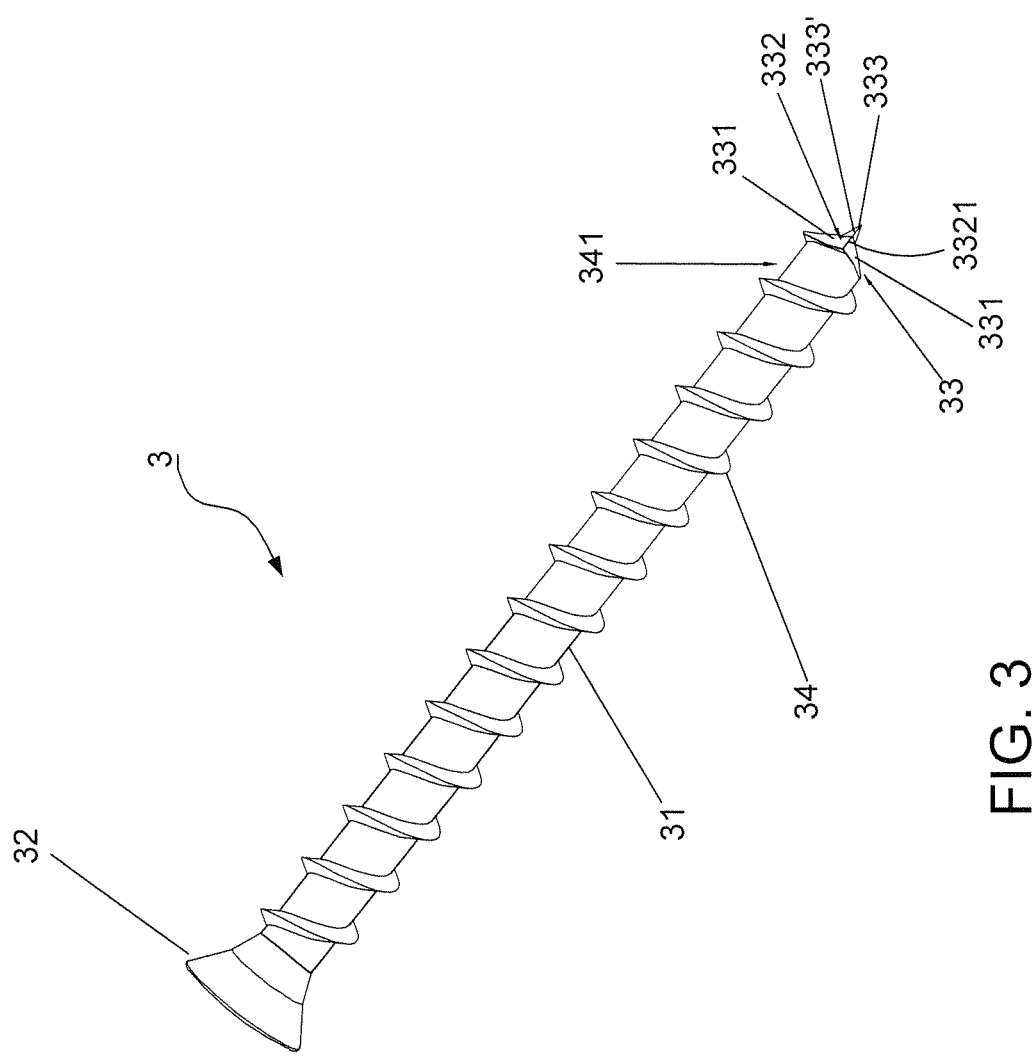
FIG. 3 is a schematic view showing a first preferred embodiment of the present invention.

Referring to FIGS. 3 and 4, a first preferred embodiment of the present invention is shown. In order to clearly show the features of the screw 3, the screw 3 in this figure and in the following embodiments is presented by one side. A screw 3 comprises a shank 31, a head 32 disposed at one end of the shank 31, a drilling portion 33 disposed at the other end of the shank 31, and a plurality of threaded units 34 surroundingly disposed around the shank 31. Wherein, a first guiding channel 341 is defined amid the threaded units 34.

Further, two inclined cutting planes 331 are convergently formed on the drilling portion 33, and a cutting edge 332 is formed on the connective cutting planes 331. Additionally, a tapered positioning member 333 is integrally bulged outwards from the convergence of the cutting planes 331 to structure a tapered unit for dividing the cutting edge 332 into dual sub cutting edges 3321. Each sub cutting edge 3321 is disposed by an inclined angle. A first included angle θ1 formed by the sub cutting edges 3321 is less than 180 degrees. The first included angle θ1 of the sub cutting edges 3321 is different from a second included angle θ2 of a taper of the tapered positioning member 333. Especially, the second included angle θ2 of the taper of the tapered positioning member 333 is smaller than the first included angle θ1 of the sub cutting edges 3321 (as shown in FIG. 5). Moreover, the positioning member 333 is assembled by a plurality of inclined walls 333' bulged from the cutting planes 331. In the figure, there are four inclined walls 333' forming a square pyramid. Alternatively, while the positioning member 333 is structured by a cone that also integrally bulges from the cutting planes 331, an oblate cone could be especially defined on the cutting planes 331 as preferably shown in FIG. 6. Accordingly, however the positioning member 333 is designed outward protrudent from the cutting planes 331, a precise positioning effect on an object 4 in time of drilling is provided. Continuingly, the sub cutting edges 3321 preferably scrapes the object 4 in time of drilling. Moreover, while the threaded units 34 around the shank portion 31 extend to the sub cutting edges 3321 and connect to an end 3322 of one of the sub cutting edges 3321, the first guiding channel 341 is formed as an intercommunicated channel amid the threaded units 34.

Figure 7:
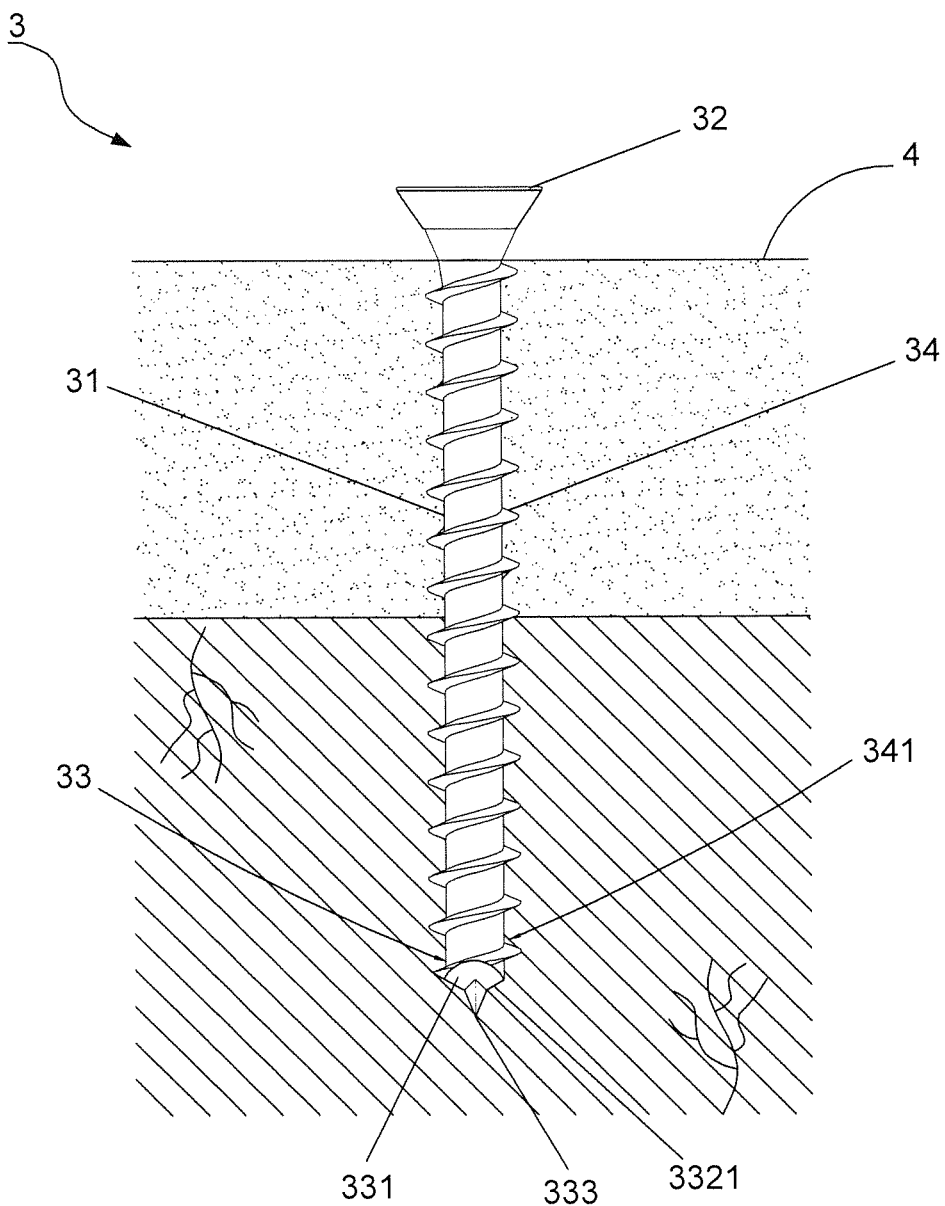
FIG. 7 is a schematic view showing a second preferred embodiment of the present invention.

Referring to FIG. 7, in operation, the positioning member 333 props the screwing object 4 (plywood is adopted in the figure) for the screw 3 to achieve a stable positioning effect. Thereby, the head 32 is imparted by a screwing torque for allowing the drilling portion 33 to enter the object 4 by means of the sub cutting edges 3321 scraping the object 4. Namely, when the positioning member 333 is served as a pivot of the screw 3, the sub cutting edges 3321 are able to steadily scrape and enter the object 4. Moreover, since the threaded units 34 extend and connect to the end 3322 of one of the sub cutting edge 3321, the cutting planes 331 thrust the cutting debris generated in time of drilling, so that the cutting debris further travels into the first guiding channel 341 amid the threaded units 34 that are connected to the end 3322 of one of the sub cutting edges 3321. Accordingly, the cutting debris is promptly removed, and there is no redundant cutting debris obstructing and compressing the vacancy between the screw 3 and the object 4, which promotes the screwing speed but decreases the screwing torque. Thus, however the screw 3 is disposed upright or tilting, it could be evenly embedded in the object 4 for a further combination.

Figure 8:
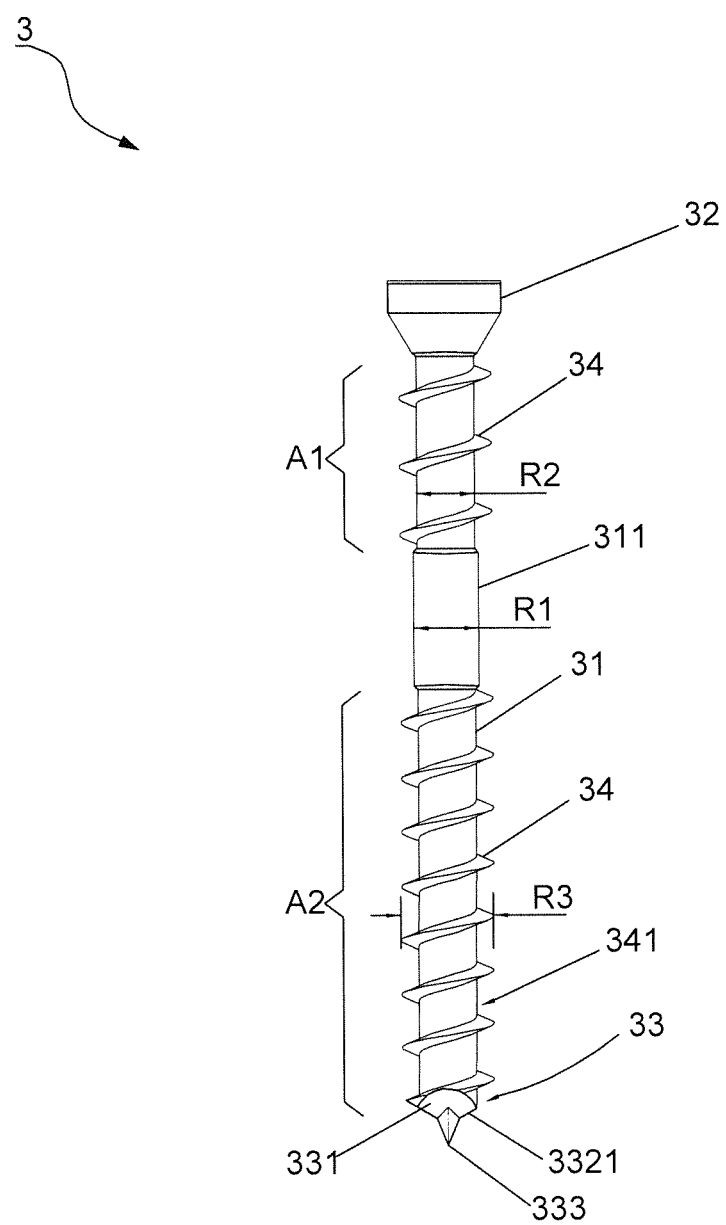
FIG. 8 is a perspective view showing a third preferred embodiment of the present invention.

Referring to FIG. 8, a third preferred embodiment is shown. In order to clearly show the features of the screw 3, the screw 3 in these figures and in the following embodiments are shown by another sides different from those of afore embodiments. Wherein, the screw 3 similarly comprises the shank 31, the head 32, the drilling portion 33, and the threaded units 34. Differently, a blank area 311 defined on the shank 31 divides the threaded units 34 into a first section A1 and a second section A2. A first diameter R1 of the blank area 311 is larger than a second diameter R2 of the shank 31 but smaller than a third diameter R3 of the threaded units 34. Further, the second section A2 of the threaded units 34 is spread to the sub cutting edges for connecting to one end 3322 of the sub cutting edges 3321.

In operation, the positioning member 333 helps the screw 3 stably situates on the object 4 (not shown), and a screwing torque is imparted on the head 32 for bringing the drilling portion 33 to go through the object 4. Herein, when the sub cutting edges 3321 contact the object 4, the second section A2 gradually gets in the object 4. Thereby, cutting debris generated in time of drilling arrive at the second section A2 along the cutting planes 331. After that, the cutting debris are expelled rapidly through the first guiding channel 341 amid the threaded units 34, the blank area 311, and the first section A1. Obviously, no redundant cutting debris will accumulate and press the vacancy between the screw 3 and the object 4. Moreover, the screw 3 could firmly stay in the object 4 since the first diameter R1 of the blank area 311 is larger than the second diameter R2 of the shank 31. Preferably, the fastened screw 3 also promotes a subsequent combination.

Figure 9:
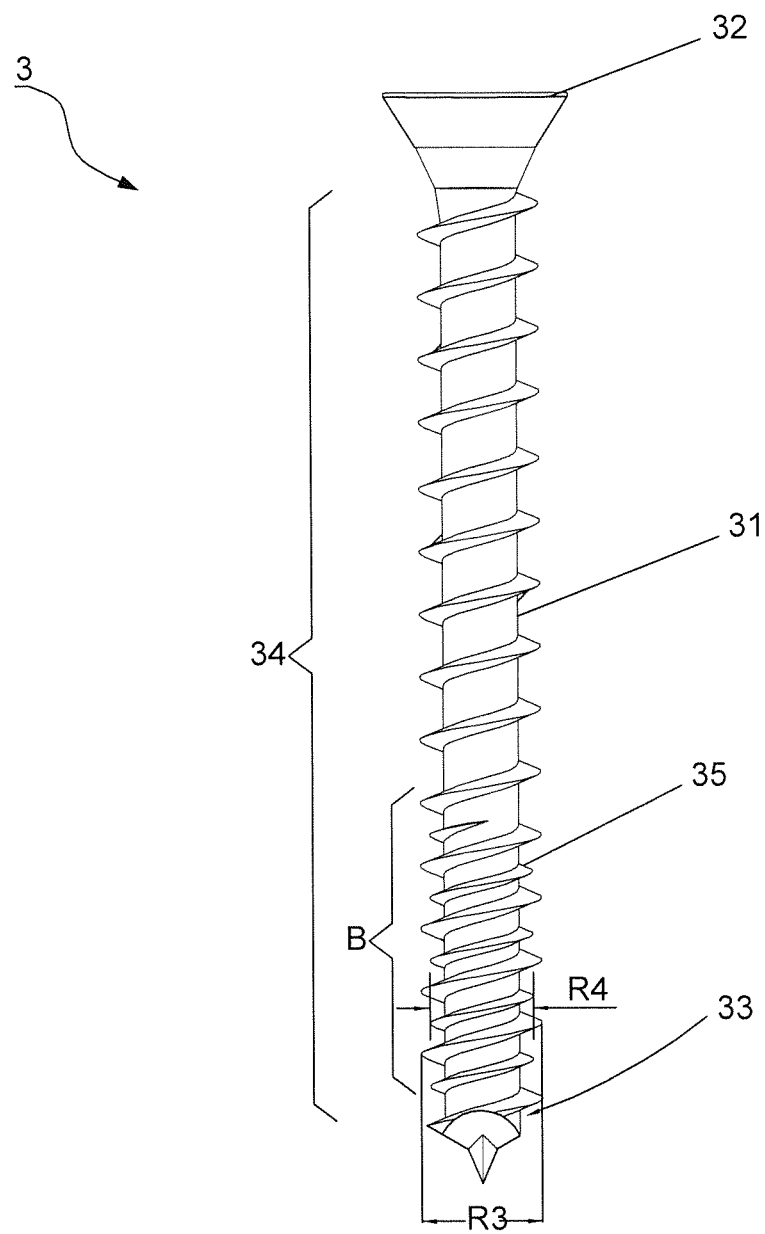
FIG. 9 is a schematic view showing a fourth preferred embodiment of the present invention.

Referring to FIG. 9, a fourth preferred embodiment is shown. The screw 3 similarly comprises the shank 31, the head 32, the drilling portion 33, and the threaded units 34 as those in the first and the second embodiments. Differently, a third section B is defined on the shank 31 and includes a plurality of auxiliary threaded units 35. The auxiliary threaded units 35 are disposed between the threaded units 34. A fourth diameter R4 of the auxiliary threaded units 35 is smaller than the third diameter R3 of the threaded units 34. Whereby, the threaded units 34 and the auxiliary threaded units 35 contribute to a high-low threaded section on the shank. Accordingly, the screw 3 is able to sever the cutting fibers and expel the cutting debris faster and more efficient. Obviously, the screwing resistance is decreased since the vacancy between the object and the screw 3 is clear and not obstructed. Thus, the screw 3 provides a smooth screwing effect and a stable combination after fastened.

Figure 10:
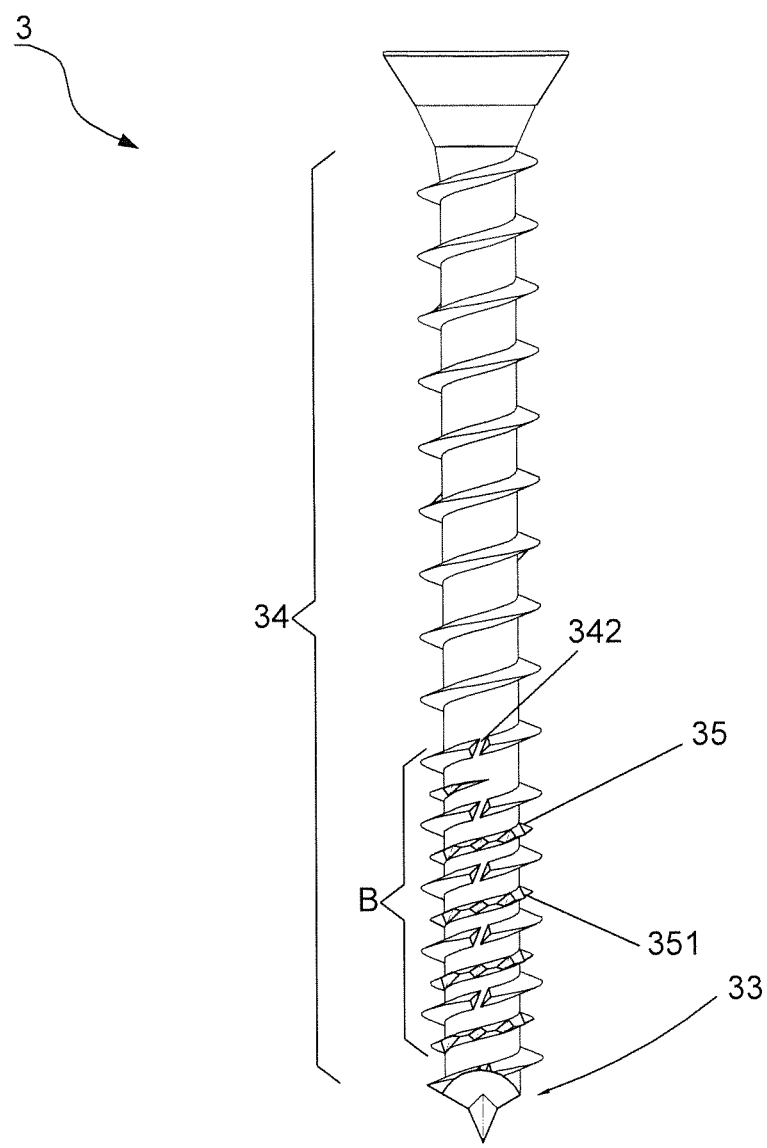
FIG. 10 is a schematic view showing a fifth preferred embodiment of the present invention.

Referring to FIG. 10, a fifth preferred embodiment is shown similar to that of fourth preferred embodiment. Differently, a plurality of indented threads 351 are formed on the auxiliary threaded units 35. Moreover, a plurality of second guiding channels 342 are partially defined on a part of the threaded units 34. Wherein, a drilling effect and a concurrent severing function could be brought about by the second guiding channels 342 and the indented threads 351, which enhances the drilling effect of the drilling portion 33 and promotes the cutting efficiency as well as the fastening performance. Favorably, the cutting debris is still timely expelled, which allows the friction and the torque in time of drilling to be largely reduced. Thus, the screw 3 is preferably embedded in the object 4, and a firm and stationary fastening performance is achieved.

To sum up, the present invention in particularly utilizes the positioning member formed on the cutting planes of the drilling portion to render a stable positioning effect. Namely, dual sub cutting edges are provided by the positioning member dividing the cutting edge of the drilling portion. Thereby, the positioning member properly positions the screw for proceeding to subsequent drilling, and the sub cutting edges as well as the cutting planes help guide the cutting debris generated in time of screwing for a speedy expelling via the cutting planes and the guiding channels amid the threaded units. Accordingly, no redundant cutting debris would pile the vacancy between the screw and the object, so the drilling torque could be decreased, but the drilling speed could be enhanced. Thus, the screw of the present invention could be firmly and smoothly embedded in the object for a further combination.

While we have shown and described the embodiment in accordance with the present invention, it should be clear to those skilled in the art that further embodiments may be made without departing from the scope of the present invention.

We claim:

1. A screw capable of rapidly drilling and cutting comprising a shank, a head disposed at one end of said shank, a drilling portion disposed at the other end of said shank, and a plurality of threaded units spirally disposed around said shank; two inclined cutting planes being formed on said drilling portion and said two inclined cutting planes being connected at a cutting edge;
   wherein, a tapered positioning member extends outward from a convergence of said cutting planes for dividing said cutting edge into dual sub cutting edges; each sub cutting edge being disposed by an inclined angle; a first included angle formed by said sub cutting edges being less than 180 degrees; said first included angle of said sub cutting edges being different from a second included angle of a taper of said tapered positioning member, and
   wherein a blank area defined on said shank divides said threaded units into a first section and a second section; a first diameter of said blank area is larger than a second diameter of said shank but smaller than a third diameter of said threaded units.

2. The screw as claimed in claim 1, wherein, said second included angle of the taper of said tapered positioning member is smaller than said first included angle of said sub cutting edges.

3. The screw as claimed in claim 1, wherein said threaded units on said shank are spread to said sub cutting edges for connecting to one end of said sub cutting edges.

4. The screw as claimed in claim 1, wherein a third section is defined on said shank and includes a plurality of auxiliary threaded units; said auxiliary threaded units are disposed between said threaded units; a fourth diameter of said auxiliary threaded units is smaller than a third diameter of said threaded units.

5. The screw as claimed in claim 4, wherein, a plurality of indented threads are formed on said auxiliary threaded units; a plurality of second guiding channels are partially defined on a part of said threaded units.

6. The screw as claimed in claim 1, wherein, said positioning member is formed by a plurality of inclined walls for structuring a pyramid.

7. The screw as claimed in claim 1, wherein, said positioning member is structured into a cone.

8. A screw capable of rapidly drilling and cutting comprising a shank, a head disposed at one end of said shank, a drilling portion disposed at the other end of said shank, and a plurality of threaded units spirally disposed around said shank; two inclined cutting planes being formed on said drilling portion and said two inclined cutting planes being connected at a cutting edge;
   wherein, a tapered positioning member extends outward from a convergence of said cutting planes for dividing said cutting edge into dual sub cutting edges; each sub cutting edge being disposed by an inclined angle; a first included angle formed by said sub cutting edges being less than 180 degrees; said first included angle of said sub cutting edges being different from a second included angle of a taper of said tapered positioning member, and
   wherein said threaded units on said shank are spread to said sub cutting edges for connecting to one end of said sub cutting edges.

9. The screw as claimed in claim 8, wherein, said second included angle of the taper of said tapered positioning member is smaller than said first included angle of said sub cutting edges.

10. The screw as claimed in claim 8, wherein a third section is defined on said shank and includes a plurality of auxiliary threaded units; said auxiliary threaded units are disposed between said threaded units; a fourth diameter of said auxiliary threaded units is smaller than a third diameter of said threaded units.

11. The screw as claimed in claim 10, wherein, a plurality of indented threads are formed on said auxiliary threaded units; a plurality of second guiding channels are partially defined on a part of said threaded units.

12. The screw as claimed in claim 8, wherein, said positioning member is formed by a plurality of inclined walls for structuring a pyramid.

13. The screw as claimed in claim 8, wherein, said positioning member is structured into a cone.

14. A screw capable of rapidly drilling and cutting comprising a shank, a head disposed at one end of said shank, a drilling portion disposed at the other end of said shank, and a plurality of threaded units spirally disposed around said shank; two inclined cutting planes being formed on said drilling portion and said two inclined cutting planes being connected at a cutting edge;
   wherein, a tapered positioning member extends outward from a convergence of said cutting planes for dividing said cutting edge into dual sub cutting edges; each sub cutting edge being disposed by an inclined angle; a first included angle formed by said sub cutting edges being less than 180 degrees; said first included angle of said sub cutting edges being different from a second included angle of a taper of said tapered positioning member, and
   wherein a third section is defined on said shank and includes a plurality of auxiliary threaded units; said auxiliary threaded units are disposed between said threaded units; a fourth diameter of said auxiliary threaded units is smaller than a third diameter of said threaded units.

15. The screw as claimed in claim 14, wherein, said second included angle of the taper of said tapered positioning member is smaller than said first included angle of said sub cutting edges.

16. The screw as claimed in claim 14, wherein, a plurality of indented threads are formed on said auxiliary threaded units; a plurality of second guiding channels are partially defined on a part of said threaded units.

17. The screw as claimed in claim 14, wherein, said positioning member is formed by a plurality of inclined walls for structuring a pyramid.

18. The screw as claimed in claim 14, wherein, said positioning member is structured into a cone.

* * * * *